United States Patent Office 3,520,791
Patented July 14, 1970

3,520,791
PROTECTIVE CIRCUIT FOR ELECTROLYTIC
MACHINING APPARATUS
Jean Pfau, Geneva, Heinz Rhyner, Meyrin-Geneva, and
Georges Marendaz, Geneva, Switzerland, assignors to
Anocut Engineering Company, Elk Grove Village, Ill.,
a corporation of Illinois
Filed Mar. 1, 1966, Ser. No. 530,997
Claims priority, application Switzerland, Mar. 4, 1965,
3,043/65
Int. Cl. B23p 1/00
U.S. Cl. 204—224                          4 Claims

ABSTRACT OF THE DISCLOSURE

This invention relates to an electrolytic machining apparatus having an electrode to machine a workpiece with means for relatively moving the workpiece and the electrode and with means for supplying electrolyte under pressure to the work gap between the electrode and the workpiece.

---

The apparatus includes an electrical system of high current capacity to feed low voltage direct current across the gap between the electrode and the workpiece in a sense to make the electrode cathodic. The electrical system includes circuit means adapted to protect the apparatus against undesired rapid changes in voltage across the gap, including voltage means sensitive to such rapid changes to break the circuit feeding the gap with another second means sensitive to voltage changes of less duration than that which would normally break the circuit to prevent operation of the first voltage sensitive means.

This invention relates to an electrolytic machining apparatus.

In general, a supply of high current capacity and low voltage is provided for an electrolyzing apparatus having an electrode and a workpiece forming a work gap in which an electrolyte is injected under pressure into the gap. In order to obtain speedy and accurate electrolyzing, it is desirable to increase to a maximum the speed of progression of the electrode whose speed is generally constant during the electrolyzing operation. This increase of speed is intended to result in an increase in the intensity of the electrolyzing current and a reduction in the spacing between the electrode and the workpiece. However, the speed is limited by short-circuiting or of arcing between the electrode and the workpiece. Short circuits or arcing may also be the result of a poor distribution in the flow of electrolyte in the gap between the electrode and said workpiece, of an insufficient injection pressure of electrolyte, or of the presence of impurities in the electrolyte.

It is well known that it is possible to detect any arcing or short-circuiting appearing during the electrolyzing operation. Such detecting circuits include generally at least one element sensitive to any rapid changes in voltage between the electrode and the workpiece, which changes appear when the electrolyzing operation is disturbed by impeding short circuits or arcings. Such signals are readily measurable. They are used to cut off the electrolyzing current and stop the automatic progression of the electrode. The operator has then to reengage the machine after removing the causes of the short circuit or arcing between the electrode and workpiece.

It is obviously of advantage for the detecting circuits to be highly sensitive and to insure a rapid cutting off of the electrolyzing current in order to prevent as far as possible any damage such as pitting of the workpiece as a result of the short circuit or arcing.

However, the voltage between the electrode and the workpiece is not constant and is disturbed by transient voltages generated by the electrolyzing current supply system, chiefly the switching of rectifiers when the direct current is obtained from a supply of alternating current through rectification. It is therefore not possible to use a detecting circuit of a sufficient sensitivity, since otherwise interruptions of the machine would frequently occur which would not be ascribable to the presence of irregularities in the electrolyzing operation but produced by such transient currents.

Consequently, it was not possible by prior art devices to avoid damage to the electrode and to the workpiece by such short circuits or arcings.

The present invention eliminates the above drawbacks by use of a highly sensitive selective detection of any arcing or short circuit which excludes the above mentioned transient currents. It provides a protective circuit for an electrolytic machining apparatus of the type including a supply of high-density low-voltage current to an electrode and workpiece and between which an electrolyte is injected under pressure. The circuit includes at least one element sensitive to any rapid change in voltage appearing between the electrode and the workpiece as upon the initiation of an arcing or short-circuiting and turns off the supply of current in response to such rapid changes. Also, there is provided a circuit to prevent response to changes in voltage, the duration of which is shorter than a predetermined duration.

An object of this invention is to provide apparatus responsive to short-circuiting or arcing between the electrode and the workpiece to turn off the electrolyzing current.

Another object of this invention is to provide a novel circuit for detecting changes in voltage over a predetermined duration and thereupon turn off the electrolyzing current.

Another object of this invention is to provide a novel circuit for preventing response to changes in voltage which is shorter than a predetermined duration.

Further aims, objects and advantages of this invention will appear from a consideration of the following description and the accompanying drawings showing for purely illustrative purposes embodiments of this invention. It is to be understood, however, that the description is not to be taken in a limiting sense, the scope of the invention being defined in the appended claims.

Referring to the drawings.

Figure 1:
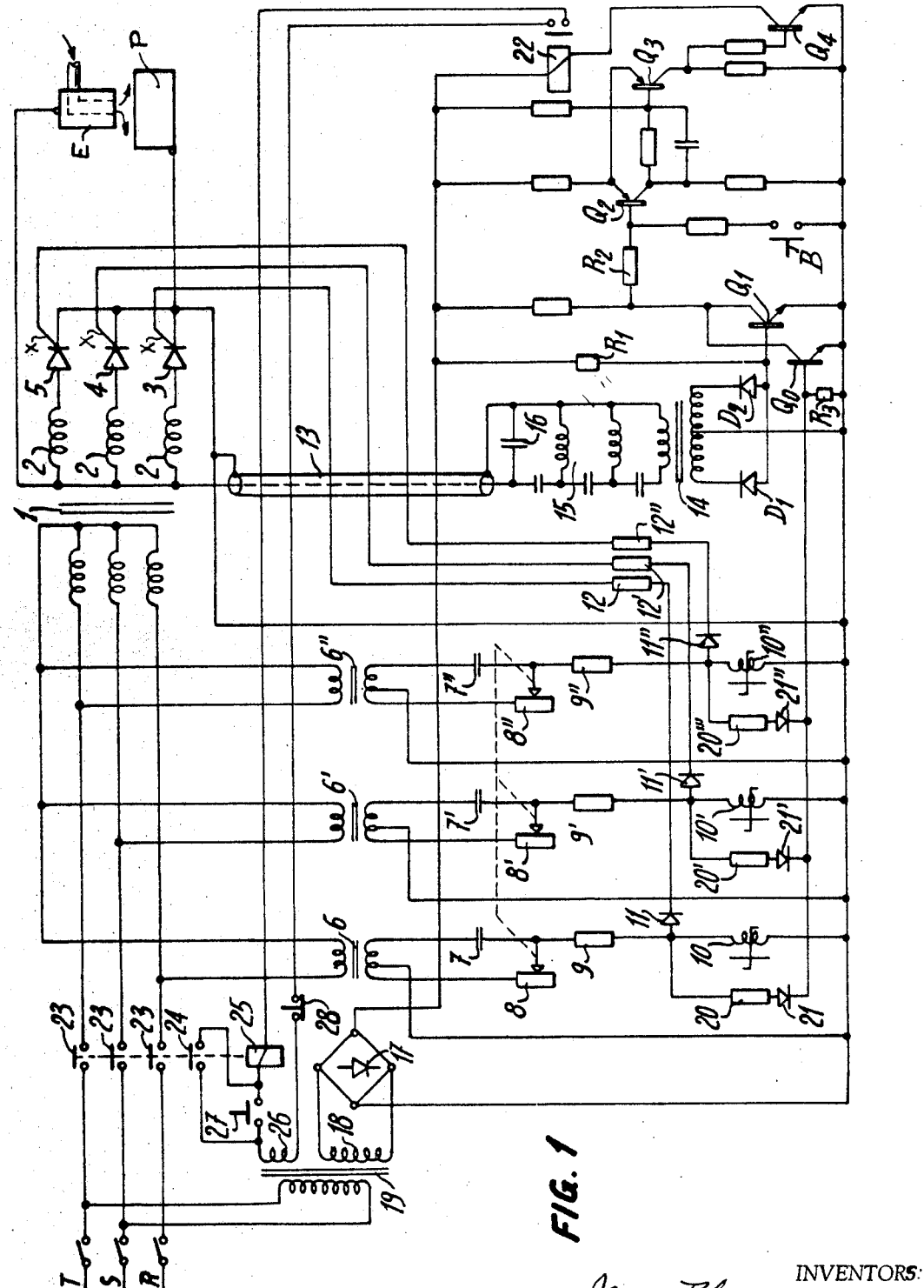
FIG. 1 is a diagram of the electrical circuit of the invention.

In the embodiment illustrated in FIG. 1, a network including a three-phase supply R, S, T feeds the primary windings of a three-phase transformer 1 of which the secondaries 2 are connected to three silicon controlled rectifiers 3, 4 and 5.

The rectifiers supply direct current for the machining of a workpiece P by means of an electrode E as is well known. An electrolyte is injected under pressure into the gap between the electrode and the workpiece by a pump (not illustrated).

Control signals to provide conduction or ignition of the controlled rectifiers 3, 4 and 5 for each controlled rectifier are supplied by transformers 6, 6' or 6". The primary of each transformer is inserted between the corresponding phase and neutral and the transformer secondary has a medial tapping. The secondary winding of the transformer 6, for instance, is connected to a condenser 7 inserted in series with a variable resistor 8. The point forming the connection between the condenser 7 and the resistor 8 is also connected through a resistor 9 and a saturable induction coil 10 to the center of the secondary winding of the transformer 6.

The arrangement described forms a phase-shift bridge circuit. The voltage between the point connecting the condenser 7 with the resistor 8 and the center tap of the transformer 6 is constant, but the phase may be shifted within broad limits to a maximum of between +90° and −90° as the resistor 8 passes through the range of values between 0 and infinity.

The induction coil 10 which is saturable is thus subjected, in series with the resistor 9, to an A.C. voltage of constant amplitude while its phase is adjustable through adjustment of the variable resistor 8. The induction coil 10 is designed to become saturated rapidly and consequently there is obtained across the terminals of coil 10 a short voltage pulse each time it enters its non-saturated condition, that is, each time the voltage supplied by the phase-shift bridge is reversed.

The voltage appearing between the induction coil 10 and the resistor 9 is transmitted through a diode 11 and a resistor 12 to the ignition electrode $x$ of the corresponding rectifier 3.

The voltages controlling rectifiers 4 and 5 are obtained by similar circuits including transformers 6' and 6" which are connected between the corresponding phases of the network and a neutral.

The circuit detecting irregularities in the electrolyzing operation is fed by a shielded lead 13 connected to electrode E and to the workpiece P. The shielded lead 13 feeds a transformer 14 through a high-pass filter 15. The input of the filter 15 is provided with a condenser 16 whose capacity is sufficient to short-circuit the high frequency transient signals collected by the line feeding the electrolyzing current to the electrode E and to the workpiece P while the electrode moves towards the workpiece P and current is not yet established through the electrolyte. However, the capacity of condenser 16 is small enough for the voltage across its terminals to follow faithfully the rapid changes in voltage appearing across the electrode E and the workpiece P when electrolyzing current is actually established.

The output voltage supplied by the secondary of transformer 14 is rectified by two diodes D1 and D2 and is transmitted as a control signal to the base of the transistor Q1. Transistor Q1 is supplied with direct current through a rectifier bridge 17 and secondary winding 18 of transformer 19 which is connected across supply phases S and T.

The collector of the transistor Q1 is connected by resistor R2 to the base of transistor Q2 which forms with the transistor Q3 a Schmitt trigger or bistable multivibrator circuit. Resistor R2 is selected so as to render Q1 conductive simultaneously with Q2 and to make Q2 nonconductive when Q1 is nonconductive. When Q1 has become nonconductive and is returned to a conductive condition, the resistor R2 is sufficiently high for it to reduce the current feeding the base of Q2 to the extent that it does not return automatically to conductivity. A disturbance of the Schmitt trigger to return Q2 to conductivity is obtained by operating the switch B.

Transistor Q1 is bridged by transistor Q0, the base of which receives the short signals controlling the ignition of the rectifiers 3, 4 and 5. These signals are transmitted through the resistors 20, 20' and 20" which are inserted in series with the diodes 21, 21' and 21".

In the absence of any signal, the transistor Q0 whose base is connected to its emitter through the resistor R3 is nonconductive whereas, in the absence of any signal, transistor Q1 is conductive by reason of the biasing of its base through resistor R1. When a signal, produced by voltages of a comparatively high frequency appearing between the electrode and the workpiece P, is applied to the base of the transistor Q1 after passing through the filter 15, the transformer 14 and the diodes D1 and D2, the transistor Q1 is nonconductive and produces consequently nonconduction of the transistor Q2 and conduction of transistor Q3. Transistor Q4 which is controlled by Q3 is in its turn nonconductive or conductive at the same time as Q3.

Thus, the presence of a signal produced by over-voltages ensures conductivity for the transistors Q3 and Q4 and this causes current to flow through the relay 22 to open its contacts which are in series with the circuit feeding the winding 25 of a three-phase switch. The opening of the relay contacts opens the three contacts 23 of the switch as the circuit supplying the winding 25 is opened, whereby the electrolyzing current is turned off. The winding 25 is fed through the secondary 26 of the transformer 19. The closing of the switch 27 by depressing a control knob energizes winding 25 and operates the three-phase switch. The maintenance of the control circuit for the three-phase switch is ensured by the holding contact 24. A further switch 28 controlled by a pusher knob allows manual operation of the electromagnetically controlled three-phase switch.

Assuming that in the circuit illustrated, the elements 3, 4 and 5 are silicon controlled rectifiers, their switching periodically produces comparatively large and very rapid modifications in voltage between the electrode E and the workpiece P. However, since the transistor Q0 receives control pulses simultaneously with any one of the rectifiers 3, 4 and 5, transistor Q0 becomes conductive throughout the duration of the transient signals produced by the switching of the controlled rectifiers. Q0 bridges the transistor Q1, and consequently if Q1 becomes transiently nonconductive under the action of the transient signal detected by the filter or delay network 15 and transmitted through the transformer 14, such a signal does not affect the transistor Q2 which remains conductive. Alternatively, if a rapid change in voltage, even of a low amplitude preliminary to a short circuit or to an arcing, appears between the electrode E and the workpiece P occurs at any other moment, it produces nonconductivity for the transistor Q1 at a moment when the transistor Q0 is also nonconductive and consequently Q2 becomes nonconductive and Q3 and Q4 become conductive. The relay 22 operates, opening its contacts to break the supply to relay coil 25 and switches off the electrolyzing current feeding the machine by opening contacts 23.

Figure 2:
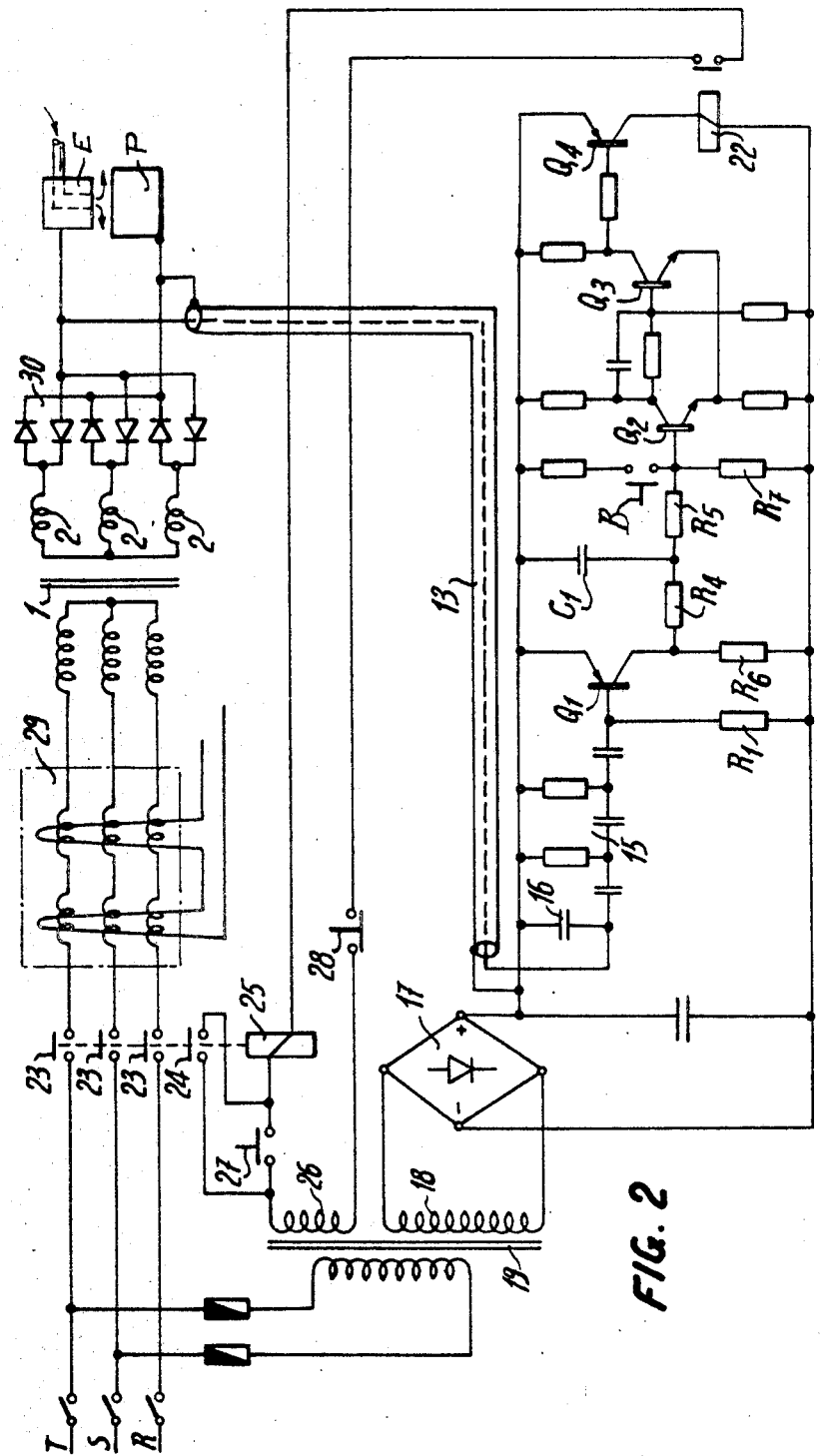
FIG. 2 is a diagram of an alternative electrical circuit embodying the invention.

FIG. 2 illustrates a further embodiment of the circuit according to the invention, the operation of which is based on a slightly modified principle. This embodiment does not rely on the detecting circuit becoming nonsensitive under the action of a control signal produced simultaneously with the transient signals which might disturb the operation of the detecting circuit. The circuit of FIG. 2 produces a signal corresponding to defective operation and adapted to stop operation of the machine only when the transient signals have reached a predetermined duration. Thus, transient signals of a short duration which are not produced by an arcing between the workpiece and the electrode, for example, those arising through the switching of the normally operating rectifiers are no longer taken into account and do not lead to a stoppage of the machine.

The arrangement of the machine in so far as the supply of transformer 1 is the same as in FIG. 1, except for the presence of a system 29, saturable induction coils which control the current in the primary of the transformer 1. The secondary 2 of transformer 1 feeds a rectifier system 30 composed of reverse poled diodes which supply a nonfiltered direct current across the electrode E and the workpiece P.

As in the case of FIG. 1, the transformer 19 supplies the rectifier bridge 17 and in turn the detecting circuit 15. Transformer 19 includes a secondary 26 feeding the coil 25 of an electromagnetically controlled switch associated with a maintenance contact. These elements carry the same reference characters as the embodiment of FIG. 1 and function in the same manner.

The detecting circuit includes as in the embodiment of FIG. 1 a bistable Schmitt trigger circuit composed of two transistors Q2 and Q3. Q3 controls the transistor Q4 and thus the current in the winding of relay 22.

The voltage between the electrode E and the workpiece P is applied through shielded lead 13 to the input of a highpass filter or delay network 15 formed by resistors and capacitances. The signal passing out of the filter 15 is fed to the base of transistor Q1 which in the absence of any signal is conductive because of the bias provided through resistor R1. When a signal appears on the base of transistor Q1, it becomes nonconductive each time the voltage of the signal is positive. This occurs each time the voltage across the electrode and the workpiece drops suddenly.

The collector of the transistor Q1 is connected with the base of transistor Q2 through a T-shaped circuit including a leakage resistance R4, a resistor R5 in series with R4 and a condenser C1 in parallel with Q1.

In the absence of any signal on the base of Q1, it is conductive and simultaneously renders the base of Q2 sufficiently positive for Q2 to be also conductive. Under such conditions Q3 and Q4 are not conductive.

When a signal passes through the filter 15 so as to control the transistor Q1, it is rendered nonconductive and the voltage on the base of Q2 is shifted gradually towards the value of the voltage on the negative terminal of the supply as the condenser C1 is being charged by the resistors R4, R5, R6 and R7. If the duration of the signal at the output of the filter 15 is sufficiently long, the voltage on the base of Q2 becomes sufficiently negative for it to bias transistor Q2 into nonconduction whereby Q3 and Q4 become conductive and operate coil 22 to switch off the electrolyzing current by opening the supply to coil 25 as in FIG. 1.

If, alternatively, the signal passing through the filter 15 is too short, Q1 becomes again conductive before Q2 has become nonconductive. A part of the charge on condenser C1 discharges through the leakage resistor R4 and the transistor Q1 while the voltage on the base of Q2 is shifted towards a positive value and the transistor Q2 remains conductive.

Various modifications may be made in the invention without departing from the spirit and scope thereof, and it is desired, therefore, that only such limitations shall be placed thereon as are imposed by the prior art and are set forth in the appended claims.

We claim:

1. In an electrolytic machining apparatus having a tool electrode, means for positioning a workpiece, means for relatively moving the workpiece positioning means and the tool electrode, means for supplying electrolyte under pressure to the work gap between the electrode and workpiece, and an electrical system of high current capacity to feed low voltage direct current across said gap in a sense to make the electrode cathodic, comprising circuit means adapted to protect the apparatus against undesired rapid changes in voltage across the gap and including a first voltage means sensitive to rapid changes in voltage to break the circuit feeding the gap and second means sensitive to voltage changes of less duration than that which will desirably break the circuit to prevent operation of said first voltage sensitive means, said second voltage sensitive means including a leakage resistance and a condenser whereby the charge on said condenser is determined by the duration of the voltage changes, said leakage resistance being adapted to return the condenser to its original charged condition and said voltage sensitive means including the multivibrator controlled by the voltage across the terminals of the condensers, whereby the state of the multi-vibrator changes as soon as said condenser voltage reaches a predetermined value corresponding to a predetermined duration of a rapid voltage change to cause operation of the voltage sensitive means.

2. In an apparatus as claimed in claim 1, wherein rectifiers of the controlled type including an element controlled by a potential in said electrical system, feed said electrical system, a supply of alternating current for said rectifiers and an igniting circuit adapted to produce signals of determined duration controlling the moment of ignition of said rectifiers, said signals controlling said second means to transiently prevent operation of said voltage sensitive means each time the condition of the rectifiers is modified.

3. In an apparatus as claimed in claim 1, wherein rectifiers of the controlled type, including an element controlled by a potential in said electrical system, feed said electrical supply system, a supply of alternating current for said rectifiers, an igniting circuit adapted to produce signals of a determined duration to control the moment of ignition of said rectifiers, and means supplied by said igniting signals to control said second means to prevent operation of the voltage sensitive means each time the condition of a rectifier is modified.

4. In an apparatus as claimed in claim 1, wherein rectifiers of the controlled type, including an element controlled by a potential in said electrical system, feed said electrical supply system, a supply of alternating current for said rectifiers, an igniting circuit adapted to produce signals of determined duration to control the moment of ignition of said rectifiers, and means supplied by said igniting signals to control the said second means whereby operation of said voltage sensitive means is prevented each time said rectifier is switched.

References Cited

UNITED STATES PATENTS

| 3,275,538 | 9/1966 | Haupt et al. | 204—143 |
| 3,328,279 | 6/1967 | Williams et al. | 204—228 |

FOREIGN PATENTS 201,472   3/1956   Australia.

JOHN H. MACK, Primary Examiner

R. L. ANDREWS, Assistant Examiner

U.S. Cl. X.R.

204—143, 228

Dedication 3,520,791.—*Jean Pfau*, Geneva, *Heinz Rhyner*, Meyrin-Geneva, and *Georges Marendaz*, Geneva, Switzerland. PROTECTIVE CIRCUIT FOR ELECTROLYTIC MACHINING APPARATUS. Patent dated July 14, 1970. Dedication filed Dec. 23, 1971, by the assignee, *Anocut Engineering Company*.

Hereby dedicates to the Public the portion of the term of the patent subsequent to Dec. 24, 1971.

[*Official Gazette April 11, 1972.*]